United States Patent [19]

Pettee

[11] 4,007,902
[45] Feb. 15, 1977

[54] FISHING ROD HOLDER
[76] Inventor: Gary K. Pettee, Rte. 3, Box 277, Roselle, Ill. 60172
[22] Filed: Oct. 9, 1975
[21] Appl. No.: 621,013
[52] U.S. Cl. .............................. 248/534; 248/530; 43/21.2; 248/156
[51] Int. Cl.² .............................. A01K 97/10
[58] Field of Search .............. 248/38, 40, 42, 156, 248/511, 534, 535, 538, 530; 43/53.5, 21.2; 17/66, 69

[56] References Cited
UNITED STATES PATENTS

| | | | |
|---|---|---|---|
| 1,706,403 | 3/1929 | Huot | 17/66 |
| 1,987,842 | 1/1935 | Sampson | 248/42 |
| 2,033,007 | 3/1936 | Raithel | 248/42 |
| 2,164,907 | 7/1939 | Falkner | 43/53.5 |
| 2,176,330 | 10/1939 | Beuckelaere | 43/53.5 |
| 2,564,065 | 8/1951 | Jaden | 248/38 |
| 2,619,308 | 11/1952 | Guestinger | 248/42 |
| 2,861,761 | 11/1958 | Nordell | 248/156 |
| D100,600 | 7/1936 | Luff | 248/38 |

Primary Examiner—Robert A. Haffer
Attorney, Agent, or Firm—Allegretti, Newitt, Witcoff & McAndrews

[57] ABSTRACT

A fishing rod holder capable of placement in the ground or attachment to a boat comprising hollow, interconnected upper and lower members positioned at acute angles to each other and preferably having a bracket for attachment to a boat hull.

3 Claims, 5 Drawing Figures

FISHING ROD HOLDER

BACKGROUND OF THE INVENTION

This invention pertains to a fishing rod holder, particularly a fishing rod holder that can be placed in either the ground or attached to a boat.

Most fishing rod holders currently manufactured are suitable for only one purpose, that is, supporting fishing rods while inserted into the ground. For example, U.S. Pat. No. 3,007,661, illustrates a fishing rod holder adapted to receive the handle of a fishing rod and insertable into the ground. This fishing rod holder, however, is not suitable for ready, firm attachment to a boat and is thus not suitable for use by a fisherman who fishes predominately from a boat. Similarly, this prior art fishing rod holder is incapable of any other function such as assisting in procuring bait or cleaning fish.

SUMMARY OF THE INVENTION

It is the broad object of the present invention to provide a fishing rod holder capable of placement in the ground or attachment to a boat.

It is another object of the present invention to provide a fishing rod holder which is also useful for removing scales from fish.

It is another object of the present invention to provide a fishing rod holder which is also useful for removing a hook from a fish.

It is another object of the present invention to provide a fishing rod holder which is also useful for digging worms from the earth.

It is another object of the present invention to provide a fishing rod holder which is also useful in measuring the length of the fish which may be caught.

It is another object of the present invention to provide a fishing rod holder which is also useful as an anchor stake.

It is another object of the present invention to provide a fishing rod holder which is also useful as a gas funnel.

These objects, as well as other objects which will become apparent from the following description of the present invention, are satisfied by providing a fishing rod holder having a tapered ground insertable bottom member having a tip capable of insertion into the ground. Preferably, the ground insertable bottom member is hollow with an open, U-shaped, cross-section. A notch can be positioned at the tip of the tapered ground member to allow the fishing rod holder to be also used as a fishing hook remover. Similarly, sharp-edge scallops can be molded into the side edge of the U-shaped bottom member to permit the fishing rod holder to also function as a fish scale remover.

Integrally formed with the tapered, bottom, ground insertable member is an upper member positioned at an acute angle to the bottom member. This top member has a longitudinal opening therein adapted to receive and hold the handle of a fishing rod and which communicates with the U-shaped section of the hollow, bottom member. Preferably, at least a portion of the front top portion of the upper member is removed to provide a taper and to expose a portion of the longitudinal opening. This facilitates the placement of a fishing rod in the rod holder and also permits the fishing rod holder to function as a gas funnel. Similarly, the acute, angled position of the bottom member relative to top member allows an individual to easily grasp the fishing rod holder and use it to dig worms from the earth.

A bracket is preferably adjustably connected to the bottom member of the fishing rod holder to permit the holder to be attached to the hull of a boat. Preferably, this bracket is positioned on the bottom member on the side opposite the forward end of the acutely angled upper member. In addition, the bracket preferably has a leading edge adapted to mate with a plurality of notches positioned in the bottom member. This top edge engages these notches and permits adjustment of the bracket to various thicknesses of boat hulls.

Other objects and embodiments will become more apparent by reference to the following description of the drawings which are part of the present specification.

DETAILED DESCRIPTION OF THE DRAWINGS

Figure 1:
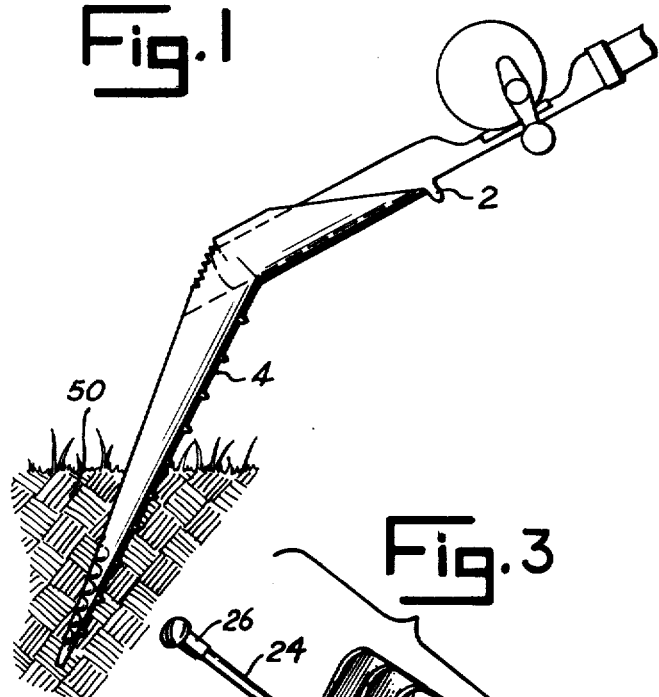
FIG. 1 is a side elevational view of the fishing rod of the present invention when used on shore.
Figure 2:
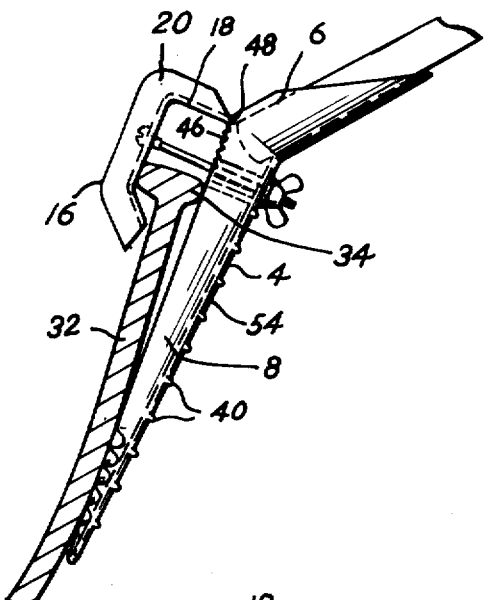
FIG. 2 is a side elevational view of the fishing rod of the present invention showing its attachment to the hull and gunwale of a boat.
Figure 3:
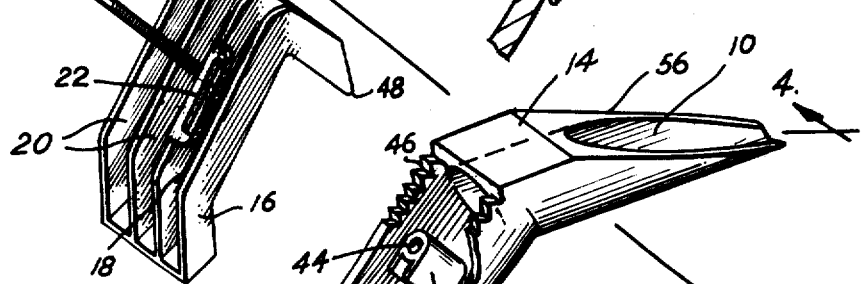
FIG. 3 is an exploded, perspective view of the fishing rod holder illustrated in FIG. 2.
Figure 5:
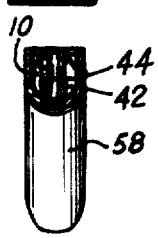
FIG. 5 is a rear, end, sectional view of the fishing rod of the present invention taken along section line 5—5 of FIG. 4.
Figure 4:
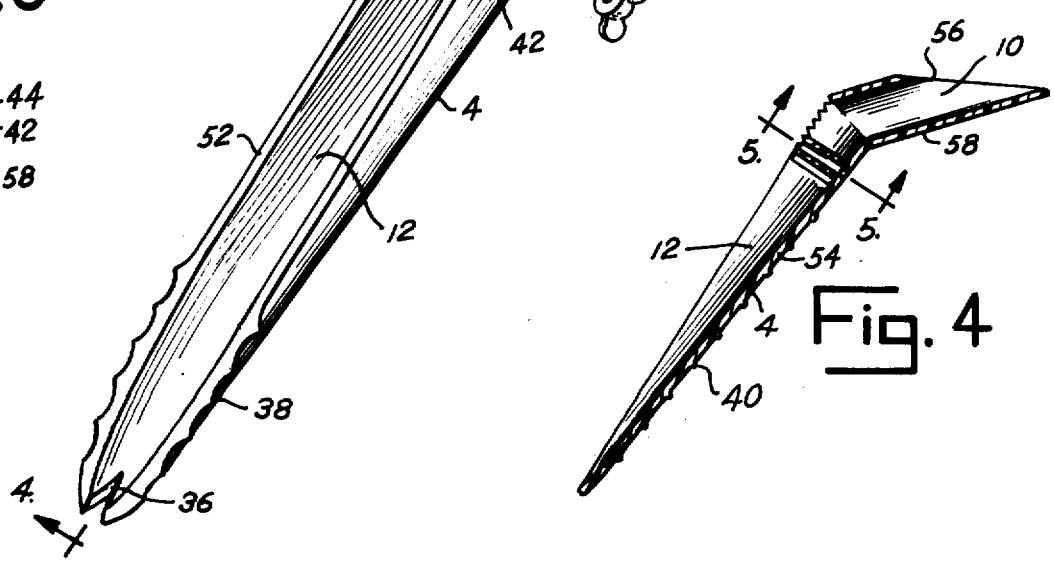
FIG. 4 is a side, sectional view of the fishing rod of the present invention taken along section line 4—4 of FIG. 3.

Referring first to FIG. 3, there is illustrated integrally molded plastic fishing rod holder 4 which comprises a hollow top portion 6 and a hollow, open, U-shaped bottom portion 8. A fishing rod 2 is placed in fishing rod holder 4 by placing the handle of the rod 2 in the opening 10 of the top portion 6 of the holder. For example, referring to FIG. 1, fishing rod 2 is held in place in the earth 50 by inserting the bottom portion 8 of the rod holder in the earth. Similarly, bottom portion 8 of the rod holder could be placed in a U-shaped bracket (not shown) or other receptacle attached to the hull of a boat.

As illustrated, opening 10 is a cylindrical opening in the top portion 6 of rod holder 4. The front top portion 6, is tapered to expose a portion of longitudinal opening 10.

Opening 10 of top portion 6 communicates with U-shaped opening 12 in the bottom portion 8 of rod holder 4. Opening 10 is separated from opening 12 by an enclosed top portion 14 of top member 6. As illustrated, top portion 6 is positioned at an acute angle to bottom member 8. This allows the fishing rod holder to also be used as a funnel for gasoline. For example, the gasoline can be readily poured into opening 8 and transmitted to a gas tank when bottom member 10 is placed in the gas tank of the engine to be filled. Similarly, this acute angled structure allows a user of the bolt of the fishing holder to easily grasp top member 6 and dig worms from the earth with the tip of bottom member 8. Similarly, bottom member 8, when inserted in the earth 50, will readily receive and hold a rope thus permitting the rod holder to function as a land based boat anchor.

Scallops 38 are integrally molded in the edge 52 of the bottom member 8 to provide a fish scaler. This fish scaler can be used to remove scales from the fish after they are caught. Similarly, a V-shaped notch 36 can be placed on the tip of bottom member 8. This notch can be placed in the mouth of a fish to assist in removing any hooks from the fish after the fish are caught. In another embodiment, spaced apart raised ribs 40 are placed on face 54 of bottom member 8. For example, ribs 40 can be spaced at half inch or one inch intervals. This permits the fishing rod holder to also be used as a means for measuring the length of the fish that have been caught to determine if they are within the length permitted by law.

A specific feature of the present invention is bracket 16 which permits fishing rod holder 4 to be attached to the hull 32 and gunwale 34 of a boat. As illustrated, bracket 16 comprises a base portion 18 having a leading edge 48. A plurality of rib members 20 are perpendicularly positioned on base 18 to provide a bracket of appreciable strength. Similarly, bottom member 8 of holder 4 is provided with a U-shaped support member 42 having an opening 44 therein to receive a bolt 24. Specifically, bracket 16 has a slot or opening 22 in base 18. Bolt 24 passes through slot 22 and through opening 44 of support member 42. Bolt 24 is then attached to bottom member 8 by means of washer 30 and wing nut 28. Bolt 24 has a square top shank portion 26 which engages the edges of slot 22 to prevent bolt 24 from turning when wing nut 28 is tightened. Edge 52 of U-shaped bottom member 8 is provided with a plurality of grooves 46 which are adapted to engage leading edge 48 of bracket 16. Edge 48 can be placed in predetermined positions in grooves 46 thereby permitting the bracket to be adjusted to accommodate boat hulls and gunwales of varying widths and thicknesses.

I claim:

1. A holder for a fishing rod capable of insertion into the ground and attachment to a boat comprising in combination:

a tapered substantially U-shaped bottom portion having a tip section insertable in the ground and an end section opposite said tip section, said end section defining a plurality of grooves along opposed edges of the U-shaped portion therealong and an opening therethrough;

a hollow top portion integral with said tapered substantially U-shaped bottom portion and extending from said end section at an acute angle, said hollow top portion defining a longitudinal opening therethrough for receipt of said fishing rod, said hollow top portion having a tapered end section to facilitate insertion of said fishing rod;

a bracket including a leading edge and a slot therethrough, said leading edge being adapted to engage a pair of said opposed grooves of said tapered, substantially U-shaped bottom portion in an assembled state; and means for securing said bracket to said tapered, substantially U-shaped bottom portion in said assembled state, said securing means passing through said slot in said bracket and said opening in said end section of said tapered, substantially U-shaped bottom portion, said bracket pivoting substantially about the engagement of said leading edge and said tapered, substantially U-shaped bottom portion, said tapered, substantially U-shaped bottom portion, said bracket, and said securing means cooperatively defining means for adjustably clamping said holder to said boat.

2. Apparatus as claimed in claim 1 wherein said tip section of said tapered, substantially U-shaped bottom portion defines a notch adapted for use as a fishing hook remover.

3. Apparatus as claimed in claim 1 wherein said tip section of said tapered, substantially U-shaped bottom portion defines a plurality of scallops adapted for use as a fish scaler.

* * * * *